(12) United States Patent
Kim et al.

(10) Patent No.: US 8,042,698 B2
(45) Date of Patent: Oct. 25, 2011

(54) FLAT DISPLAY AND FLAT DISPLAY APPARATUS HAVING THE SAME

(75) Inventors: Tae-sung Kim, Suwon-si (KR); Sung-gi Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 628 days.

(21) Appl. No.: 11/934,227

(22) Filed: Nov. 2, 2007

(65) Prior Publication Data

US 2008/0291611 A1 Nov. 27, 2008

(30) Foreign Application Priority Data

May 22, 2007 (KR) ........................ 10-2007-0049626

(51) Int. Cl.
*A47G 7/00* (2006.01)
(52) U.S. Cl. ....................................................... 211/78
(58) Field of Classification Search .................... 211/78, 211/182, 189, 195, 201, 202, 70, 163, 165; 160/135; 52/69–71, 585.1; 403/292, 294; 361/679.21, 724, 730; 248/200.1, 220.22; 312/7.2, 265.5, 111; 40/605, 606.15, 606.14; 348/836, 383, 794, 789; 345/1.3, 905
See application file for complete search history.

(56) References Cited

U.S. PATENT DOCUMENTS

| 2,194,238 | A | * | 3/1940 | Weaver | 312/125 |
| 2,923,417 | A | * | 2/1960 | Sonksen | 211/165 |
| 3,426,913 | A | * | 2/1969 | Abatiell, Jr. | 211/194 |
| 3,924,749 | A | * | 12/1975 | Weston | 211/4 |
| 3,957,159 | A | * | 5/1976 | Radek | 211/4 |
| 3,960,273 | A | * | 6/1976 | Weston | 211/4 |
| 4,030,219 | A | * | 6/1977 | Donovan | 40/605 |
| 4,250,676 | A | * | 2/1981 | Presby | 52/222 |
| 4,723,819 | A | * | 2/1988 | Ramberg | 312/130 |
| 4,761,922 | A | * | 8/1988 | Black | 52/71 |
| 4,998,023 | A | * | 3/1991 | Kitts | 280/47.35 |
| 5,115,855 | A | * | 5/1992 | Lindblom et al. | 160/135 |
| 5,226,548 | A | * | 7/1993 | Koeppel | 211/144 |
| 5,280,840 | A | * | 1/1994 | Terpening | 211/165 |
| 5,494,178 | A | * | 2/1996 | Maharg | 211/189 |
| 5,537,766 | A | | 7/1996 | Nickens et al. | |
| 5,544,438 | A | * | 8/1996 | Fazekas | 40/605 |
| 5,975,660 | A | * | 11/1999 | Tisbo et al. | 312/263 |
| 6,010,017 | A | * | 1/2000 | Michaelis et al. | 211/133.4 |
| 6,065,407 | A | * | 5/2000 | Wang | 108/147.13 |
| 6,105,292 | A | * | 8/2000 | Current | 40/605 |

(Continued)

FOREIGN PATENT DOCUMENTS

CN 1628279 6/2005

(Continued)

OTHER PUBLICATIONS

European Search Report issued Jun. 7, 2011 in EP Application No. 08103137.9.

(Continued)

*Primary Examiner* — Jennifer E. Novosad
(74) *Attorney, Agent, or Firm* — Stanzione & Kim, LLP

(57) ABSTRACT

A flat display including a display main body to receive a display panel to display an image and a receiving member which is formed with receiving holes disposed at opposite lateral sides of the display main body.

14 Claims, 15 Drawing Sheets

U.S. PATENT DOCUMENTS

| | | | |
|---|---|---|---|
| 6,202,369 B1* | 3/2001 | Partee et al. | 52/165 |
| 6,202,867 B1* | 3/2001 | Di Blasi et al. | 211/188 |
| 6,260,296 B1* | 7/2001 | Carney, Jr. | 40/747 |
| 6,340,092 B1* | 1/2002 | McGrath, Jr. | 211/169 |
| 6,394,292 B1* | 5/2002 | Sabounjian | 211/202 |
| 6,520,347 B2* | 2/2003 | Caplan et al. | 211/40 |
| 6,729,054 B1* | 5/2004 | VanderTuin | 40/452 |
| 6,951,068 B1* | 10/2005 | Weatherill | 40/729 |
| 7,331,358 B2* | 2/2008 | Gallina et al. | 137/315.15 |
| 7,373,746 B1* | 5/2008 | Pettesch | 40/605 |
| 7,878,476 B2* | 2/2011 | Carson et al. | 248/429 |
| 2002/0149543 A1 | 10/2002 | Clifton et al. | |
| 2003/0000904 A1* | 1/2003 | Lung et al. | 211/163 |
| 2003/0217495 A1* | 11/2003 | Nagamine et al. | 40/605 |
| 2005/0219807 A1 | 10/2005 | Kim | |
| 2006/0151180 A1 | 7/2006 | Gallina et al. | |
| 2006/0168865 A1* | 8/2006 | Watanabe | 40/745 |
| 2006/0228174 A1* | 10/2006 | Woodhead et al. | 403/371 |
| 2006/0232496 A1 | 10/2006 | Sato | |
| 2007/0000849 A1* | 1/2007 | Lutz et al. | 211/26 |
| 2008/0111929 A1* | 5/2008 | Yokota et al. | 348/836 |

FOREIGN PATENT DOCUMENTS

| | | |
|---|---|---|
| CN | 2864782 | 1/2007 |
| JP | 10198286 | 7/1998 |
| KR | 2006-113516 | 11/2006 |

OTHER PUBLICATIONS

Korean Office Action issued Feb. 23, 2011 in KR Application No. 10-2007-0049626.

Chinese Office Action issued Aug. 22, 2011 in CN Application No. 200810093666.0.

* cited by examiner

FLAT DISPLAY AND FLAT DISPLAY APPARATUS HAVING THE SAME

CROSS-REFERENCE TO RELATED APPLICATIONS

This application claims priority under 35 U.S.C. §119(a) from Korean Patent Application No. 10-2007-0049626, filed on May 22, 2007 in the Korean Intellectual Property Office, the disclosure of which is incorporated herein in its entirety by reference.

BACKGROUND OF THE INVENTION

1. Field of the Invention

The present general inventive concept relates to a flat display and a flat display apparatus having the same, and more particularly, to a flat display which has an improved display combining structure and a flat display apparatus having the same.

2. Description of the Related Art

In general, a flat display is a term collectively mentioning a TV, a computer monitor and other known displays in the art. The flat display has a display main body, a display panel which forms an image, and/or a backlight unit which is provided at the back side of the display panel. The flat display has a small thickness from front to rear compared to a cathode ray tube (CRT) monitor, and has been used in many fields.

In general, the display panel forms the image using digital light processing (DLP), a liquid crystal display (LCD), a plasma display panel (PDP) or other known display panels in the art.

There is an increasing demand for a flat display apparatus where one large screen is formed by disposing a number of displays to be adjacent therebetween. For example, a flat display apparatus having a 4×4 array of the displays (that is, 4 displays in a row and 4 displays in a column) may form one large screen or a number of small screens using each of the displays.

However, in the flat display apparatus having such a large screen, it would be convenient if a plurality of flat displays could be simply installed or combined and a combining structure of a large multi-screen could be easily changed while the flat displays are combined therebetween.

SUMMARY OF THE INVENTION

The present general inventive concept provides a flat display and a flat display apparatus having the same where a combination between flat displays can be made quickly and easily.

The present general inventive concept also provides the flat display and flat display apparatus having the same where a combining structure of the flat displays can be easily changed.

The present general inventive concept also provides the flat display and flat display apparatus having the same whose external appearance and reliability can be improved.

Additional aspects and utilities of the present general inventive concept will be set forth in part in the description which follows and, in part, will be obvious from the description, or may be learned by practice of the present general inventive concept.

The foregoing and/or other aspects of the present general inventive concept can be achieved by providing a flat display including a display main body to receive a display panel to display an image and a receiving member which is formed with receiving holes disposed at opposite lateral sides of the display main body.

The receiving holes may penetrate along the opposite lateral sides of the display main body.

The receiving hole may have a shape of a circle or a rectangle.

The receiving holes may be formed at upper and lower portions of the opposite lateral sides of the display main body respectively to have the same axis therethrough.

The receiving holes may also face each other at the opposite lateral sides of the display main body and are spaced apart from a projection area of the display panel at a back side of the display panel.

The receiving holes may face each other at the opposite lateral sides of the display main body and are spaced apart from a projection area of the display panel at a back side of the display panel.

The flat display may further include a reinforcing member to correspond to a shape of the receiving member and to be combined to the receiving member.

The flat display may further include a combining member to correspond to a shape of the receiving member or the reinforcing member and to be combined to the receiving member or the reinforcing member.

The combining member may have an inserting portion which is combined to the receiving member or the reinforcing member, and a protruding member having a circumference larger than a circumference of the inserting portion.

The flat display may further include an engaged portion which is formed in one of the reinforcing member and the combining member, and an engaging portion which is formed in an other of the reinforcing member and the combining member to be engaged with the engaged portion.

The foregoing and/or other aspects of the present general inventive concept can also be achieved by providing a flat display apparatus including a stand, a display which has a display main body to receive a display panel to display an image, and a receiving member that is formed with receiving holes disposed at opposite lateral sides of the display main body, a combining member which is combined to the receiving member to form a display column by laying the display on the stand in a vertical direction and a rotating member which is combined with the combining member so that at least one display column can be rotated with respect to at least an other display column.

The receiving holes may face each other at the opposite lateral sides of the display main body and are spaced apart from a projection area of the display panel at a back side of the display panel.

The flat display apparatus may further include a reinforcing member to correspond to a shape of the receiving member and to be combined to the receiving member.

The combining member may have an inserting portion which is combined to the receiving member or the reinforcing member, and a protruding member having a circumference larger than a circumference of the inserting portion.

The foregoing and/or other aspects and utilities of the general inventive concept may also be achieved by providing a displaying apparatus usable with a plurality of flat panels, the display apparatus including a first combining member to couple a first set of adjacent flat displays to form a first display column, a second combining member to couple a second set of adjacent flat displays to form a second display column and a rotating member to rotatably couple the first combining member and the second combining member to allow the first display column to rotate with respect to the second display column.

The foregoing and/or other aspects and utilities of the general inventive concept may also be achieved by providing a method of displaying a plurality of flat panels, the method including forming a first display column by coupling a first set of adjacent flat displays through a first combining member, forming a second display column by coupling a second set of adjacent flat displays through a second combining member to form a second display column and rotatably coupling the first combining member and the second combining member through a rotating member to allow the first display column to rotate with respect to the second display column.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Figure 1:
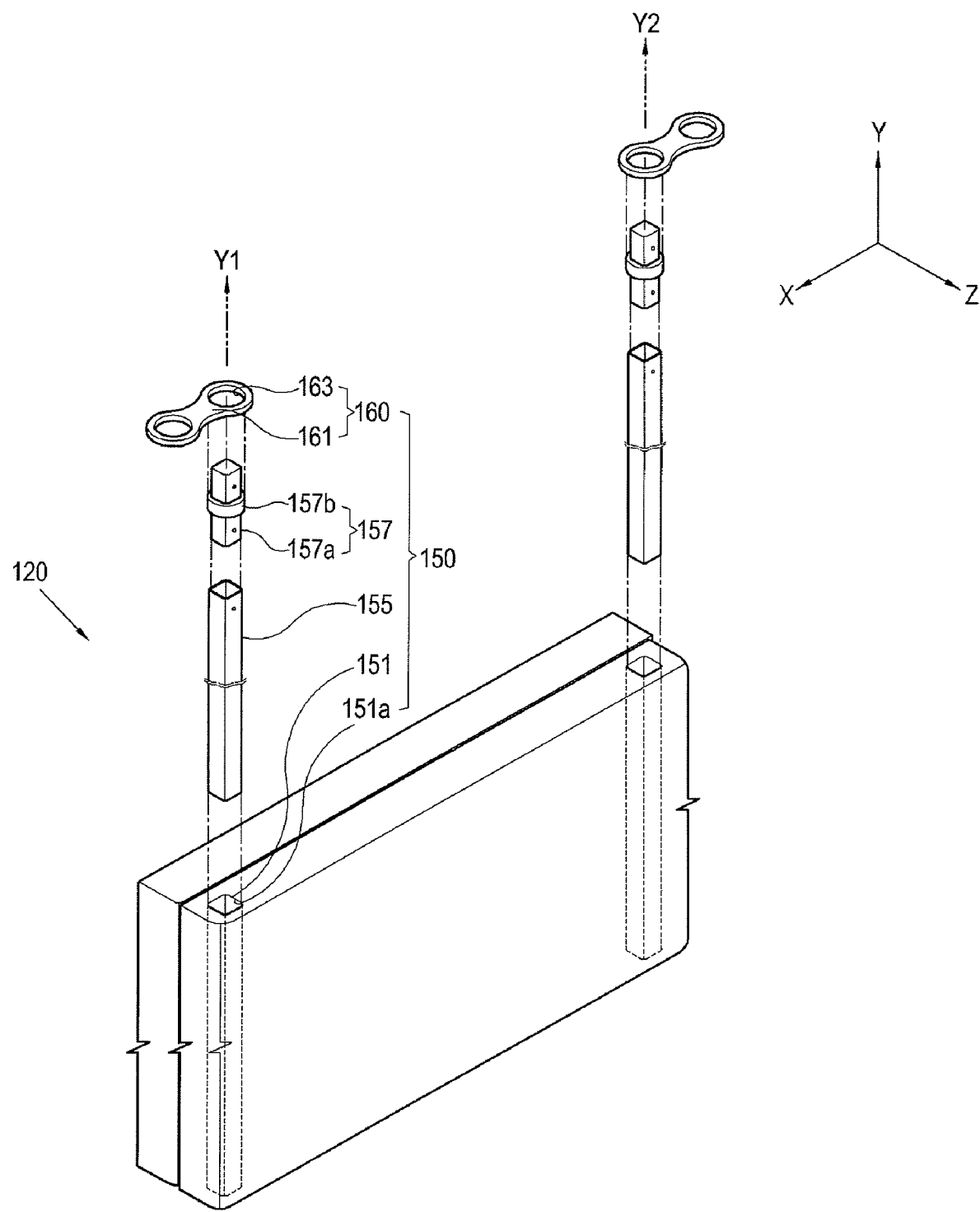
FIG. 1 is a perspective view illustrating a flat display according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As illustrated in FIGS. 1 to 10, a flat display 120 according to various embodiments of the present general inventive concept has a display main body 121 (FIG. 2) and a receiving member 151. As illustrated in FIGS. 4 to 10, a flat display apparatus 100 according to various embodiments of the present general inventive concept includes a stand 110, displays 120, combining members 157 and rotating members 160.

Figure 4:
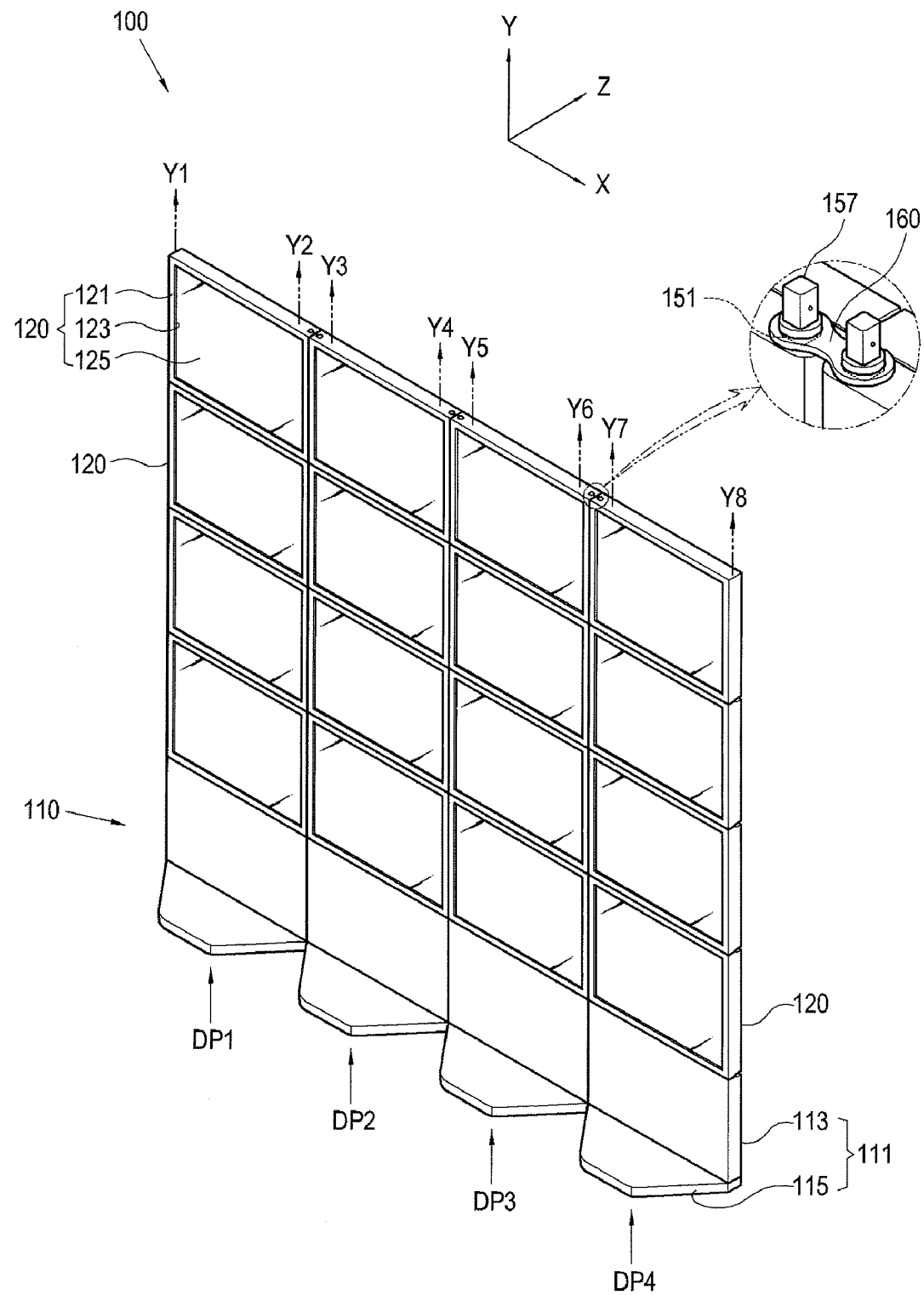
FIG. 4 is a perspective view illustrating a flat display apparatus according to another exemplary embodiment of the present general inventive concept.

FIG. 4 illustrates the flat display apparatus 100 having flat displays 120 of a number of, for example, 4×4=16. That is, the flat display apparatus 100 in FIG. 4 has four display columns DP1, DP2, DP3 and DP4, where each display column DP includes four flat displays 120 respectively.

Figure 12:
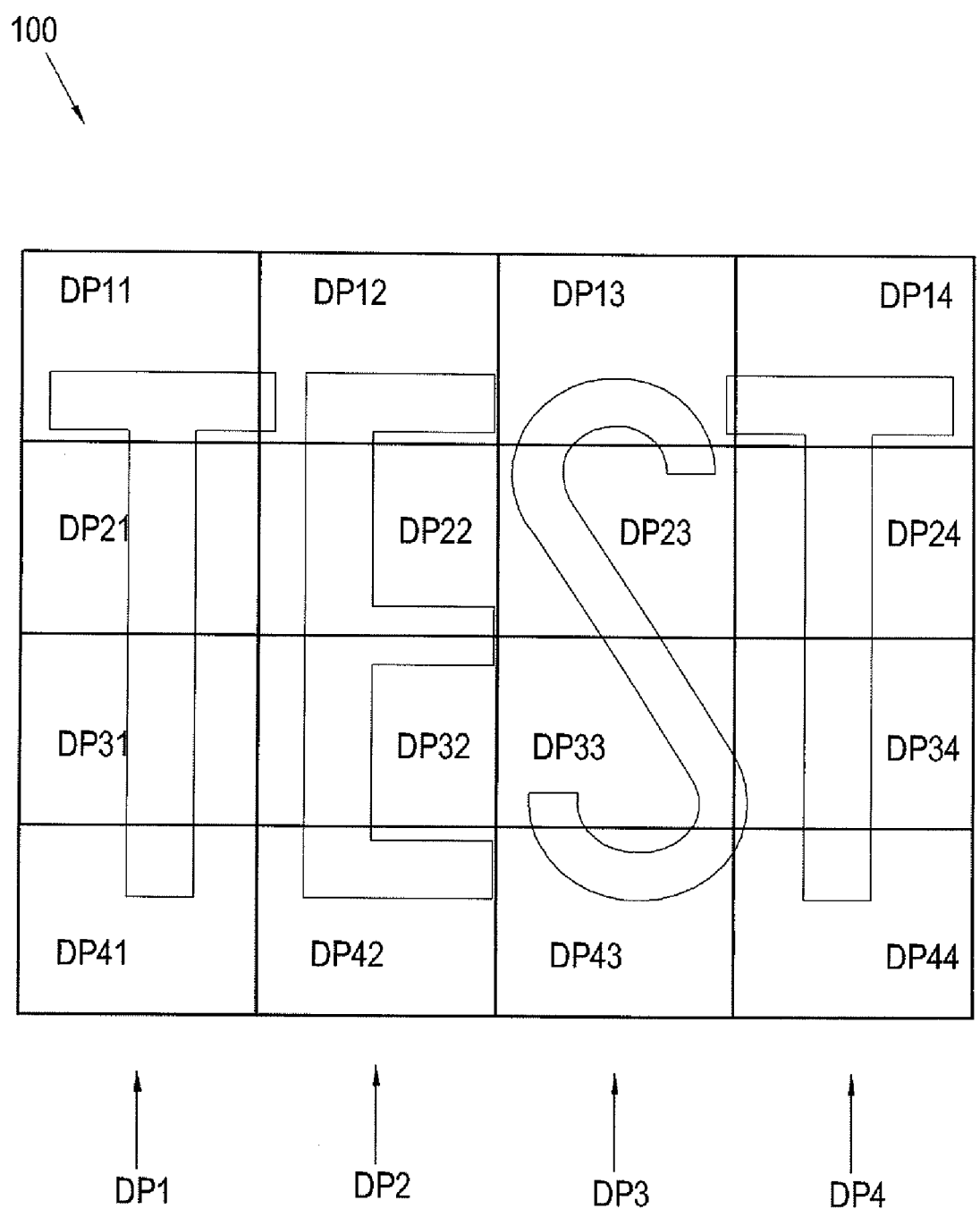
FIG. 12 is a schematic view illustrating the flat display apparatus in FIG. 4 to illustrate an overall image thereof.

In this case, for the convenience in description, referring to FIGS. 4 and 12 the display columns are referred to as a first display column DP1, a second display column DP2, a third display column DP3 and a fourth display column DP4 in order from left to right thereof (refer to an axis direction "X" in FIG. 4). That is, in the first display column DP1, four flat displays 120 of reference numerals DP11, DP21, DP31 and DP41 are disposed in a vertical direction (refer to an axis direction "Y" in FIG. 4). Likewise, four flat displays 120 of reference numerals DP12, DP22, DP32 and DP42 are disposed in the vertical direction in the second display column DP2, four flat displays 120 of reference numerals DP13, DP23, DP33 and DP43 are disposed in the vertical direction in the third display column DP3, and four flat displays 120 of reference numerals DP14, DP24, DP34 and DP44 are disposed in the vertical direction in the fourth display column DP4, respectively.

Also, reference numerals Y1 to Y8 in FIG. 4 are lines, which vertically extend from a center axis of the combining member 157 in each display column DP, and are substantially parallel with the axis direction Y.

Hereinafter, for a reference numeral "DPij", "i" means a row number and "j" means a column number. Also, the display column may be indicated as only "DP" if there is no need to divide the display column.

Figure 10:
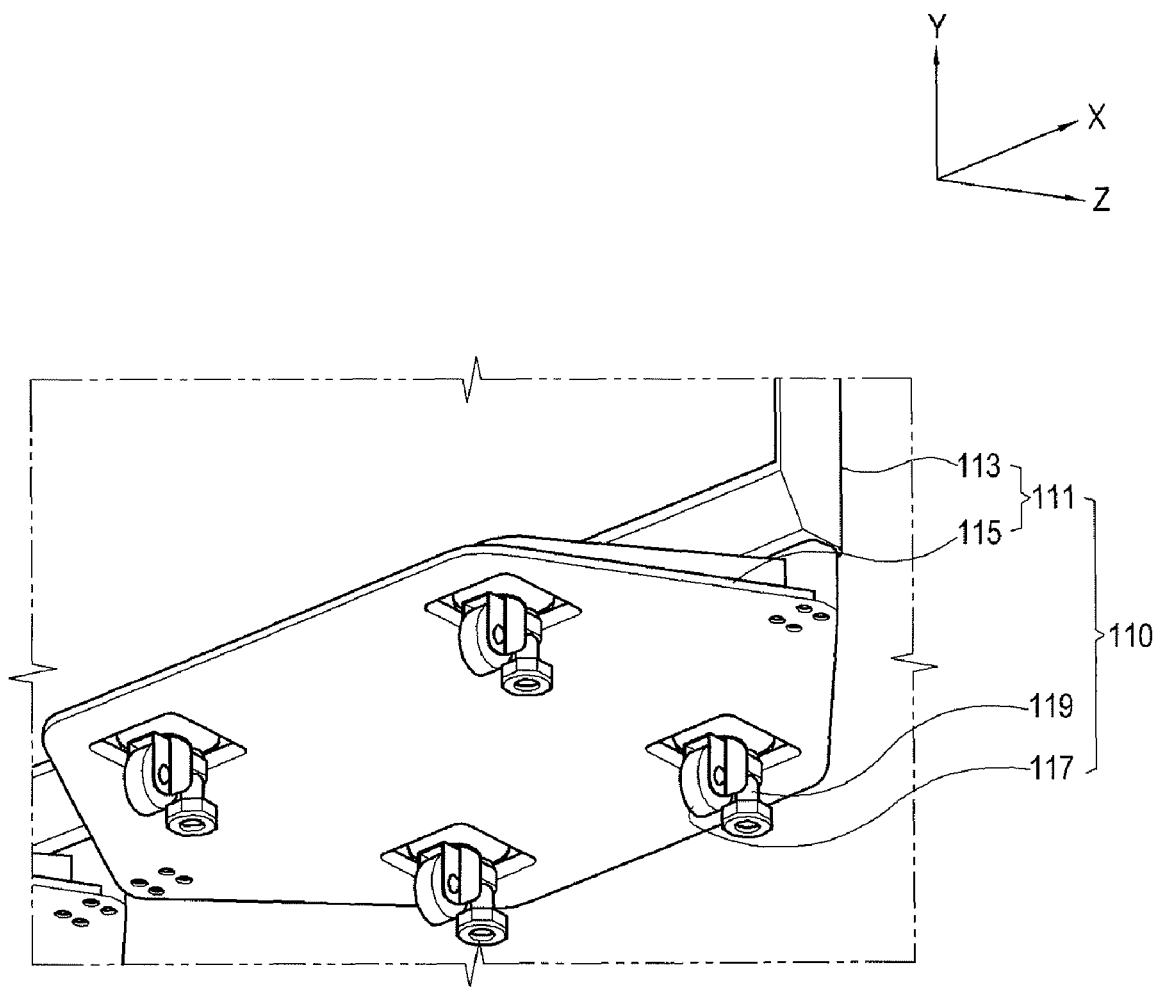
FIG. 10 is a perspective view illustrating a bottom side of a stand of the flat display apparatus in FIG. 4.

As illustrated in FIG. 4 and FIG. 10, the stand 110 supports the flat display 120 against an installation surface. The stand 110 includes a stand main body 111, a rolling member 117 and a securing member 119.

The stand main body 111 includes a vertical member 113 which is combined with the flat display 120 in the vertical direction, and a horizontal member 115 which is combined with a lower end portion of the vertical member 113 in a transverse direction of the vertical member 113. Accordingly, the display column DP can be stably supported by the stand main body 111.

The rolling member 117 is combined to a lower portion of the horizontal member 115 so that the stand main body 111 can be rotated with respect to the installation surface. The rolling member 117 includes a caster. Such a rolling member 117 may include a unit or portion to move to a predetermined position with respect to the installation surface and fixing its position with respect to the installation surface, for example, the caster with a brake mounted thereon.

The securing member 119 is combined to a lower portion of the stand main body 111 so that the stand main body 111 can be prevented from moving with respect to the installation surface and a height of the stand main body 111 can be adjusted. In this case, four securing members 119 may be disposed at a lower end portion of the horizontal member 115 in the lower portion of the stand main body 111 to be separated therebetween as distantly as possible. Accordingly, the height of the flat displays 120 can be adjusted to be uniform by adjusting the height of the securing member 119 even if the installation surface is uneven or inclined. Therefore, each display column DP can be stably supported, and a stability and reliability of the flat display apparatus 100 can be improved.

The display column DP is disposed vertically (that is, the axis Y direction in FIG. 4) by combining the flat display 120 with the stand 110. Each screen surface 125 of the flat displays 120 in the display column DP is disposed to form a same plane surface. The display column DP is formed by vertically combining the stand 110 and the flat displays 120 using the combining unit 150 (FIG. 1), thus forming a large multi-screen. In this case, the display column DP is exemplarily embodied by combining four flat displays 120 and a stand 110. However, for example, the display column DP may also be formed by vertically disposing two flat displays 120, five flat displays 120 or other number of the flat displays 120. Also, in this exemplary embodiment, four display columns DP are horizontally combined therebetween. However, for example, three or five or other number of the display columns DP may be horizontally combined therebetween.

The flat display 120 includes the display main body 121 which has a display opening 123, and a display panel 127 which includes a screen surface 125 which forms an image and is disposed in the display opening 123.

Referring to FIG. 4, the display main body 121 has the display opening 123 in its central area, where the display opening receives the screen surface 125 forming the image. The display main body 121 includes the receiving member 151 at opposite lateral areas thereof. The display main body 121 receives a display panel 127 (FIG. 2), and may be formed by combining a front cover (not illustrated) and a rear cover (not illustrated).

Referring to FIG. 1, a combining unit 150 includes the receiving member 151, the combining member 157 and a rotating member 160. The combining unit 150 may include a reinforcing member 155.

Figure 2:
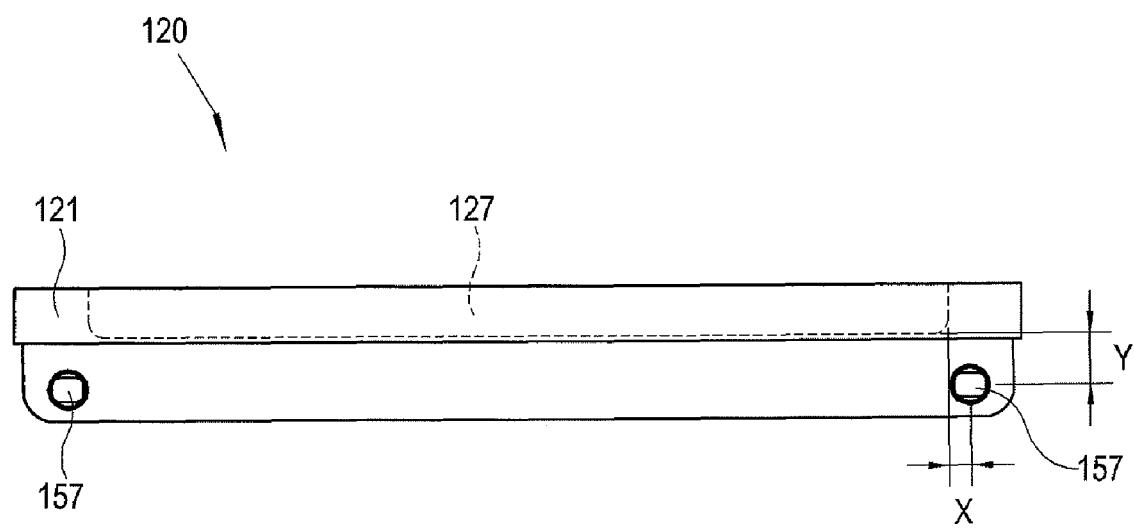
FIG. 2 is a plan view illustrating the flat display in FIG. 1.

Referring to FIGS. 1 and 2, the receiving member 151 is formed at opposite lateral areas of the display main body 121 in the axis Y direction, and includes a receiving hole 151a. The receiving member 151 is sufficiently strong enough to receive and solidly support a combining member 157 which vertically combines the display main body 121. In this case, a reinforcing member 155 may be combined to the receiving member 151 in consideration of a size of the flat display 120, a number of the flat displays 120 that are disposed in the vertical direction and other factors.

Figure 3:
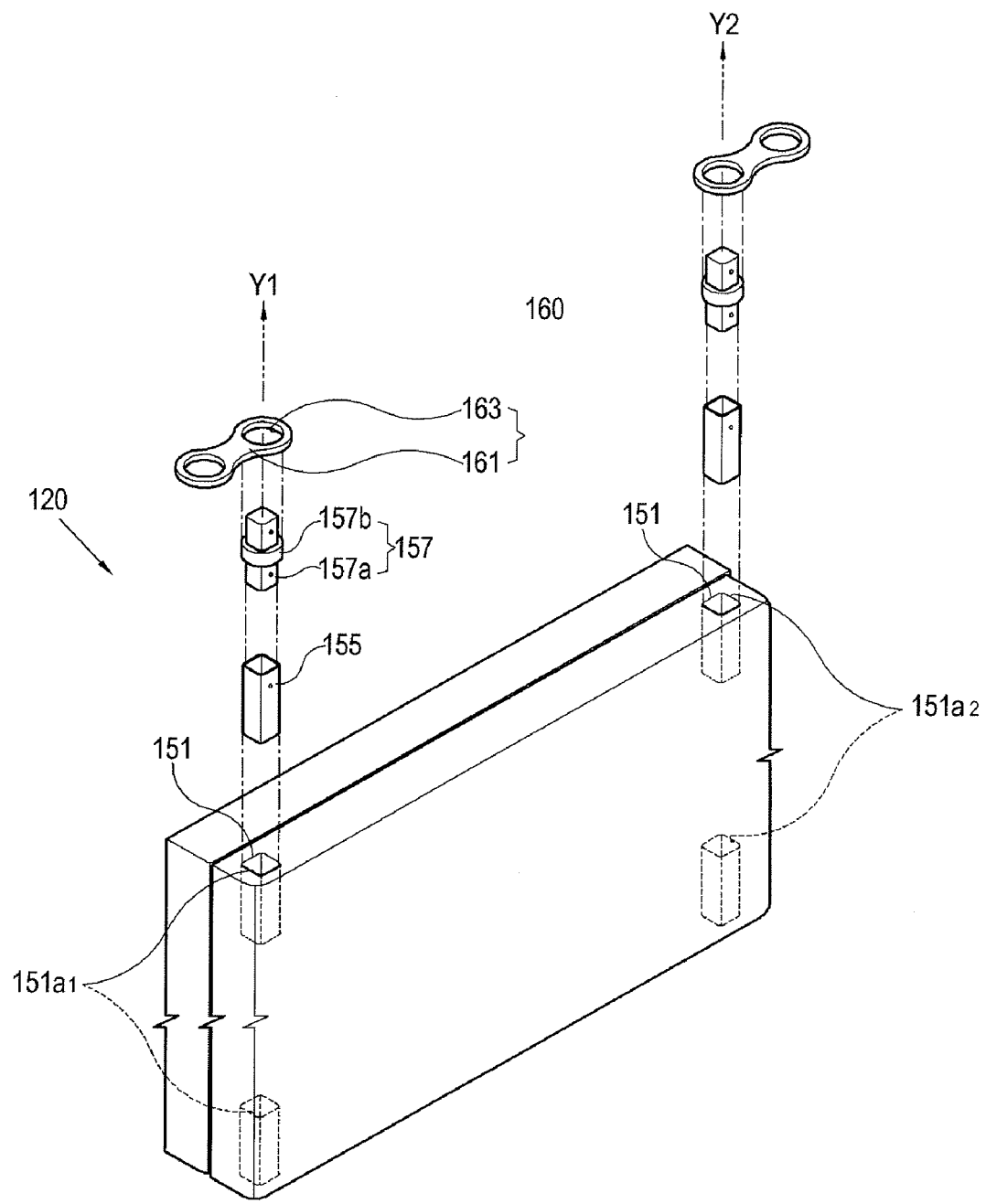
FIG. 3 is a perspective view illustrating the flat display according to another exemplary embodiment of the present general inventive concept.

As illustrated in FIG. 1, the receiving hole 151a is penetratingly formed to be apart from a projection area of the display panel 127 (FIG. 2). Also, as illustrated in FIG. 3, another exemplary embodiment of the receiving hole 151a is formed to be apart from the projection area of the display panel 127 not penetratingly but in upper and lower portions of the opposite lateral sides of the display main body 121 to have the same axis respectively. That is, center line of the upper and lower receiving holes 151a1 at the left side of the display main body 121 coincides with the axis Y1, and the center line of the upper and lower receiving holes 151a2 at the right side of the display main body 121 coincides with the axis Y2.

Also, as illustrated in FIG. 2, the receiving hole 151a is distant apart from end portions of the opposite lateral sides of the display panel 127 in a predetermined distance (refer to "X" in FIG. 2) and is distant apart from an end portion of a back side of the display panel 127 in a predetermined distance (refer to "Y" in FIG. 2). In this case, the distances X and Y are determined in consideration of material of the display main body 121, the number of the flat displays 120 that are disposed in the vertical direction, the size of the flat display 120 and others.

The reinforcing member 155 can be combined to the receiving member 151. The reinforcing member 155 reinforces a strength of the combining member 157 and may have a shape of a rectangle or a circle. However, the shape of the reinforcing member 155 is not limited to the rectangle and the circle but may also be any other shape. The reinforcing member 155 may be made of metal so that it can support the strength of the display main bodies 121 that are disposed in the vertical direction.

The combining member 157 is provided between the display main bodies 121 and combined with the reinforcing member 155. The combining member 157 includes an inserting portion 157a and a protruding portion 157b.

The inserting portion 157a extends upwards and downwards from the protruding portion 157b respectively to be combined with the reinforcing member 155. The inserting portion 157a is received within the reinforcing member 155 having the shape of a rectangular tube, and has a shape of a rectangular member to correspond to the shape of the reinforcing member 155. In this exemplary embodiment, the inserting portion 157a and the receiving member 151 are provided to have a rectangular shape, so that they cannot be rotated with respect to the display main body 121. However, the inserting portion 157a or the receiving member 151 may also be provided to have a cylindrical shape, so that they can be rotated with respect to the display main body 121.

The protruding portion 157b is provided at a central area of the combining member 157 and has a circular shape. A rotating hole 163 of the rotating member 160 is combined to the protruding portion 157b, thus enabling the rotating member 160 to be rotatable with respect to the protruding portion 157b. Accordingly, while rotating, the display column DP can be integrally rotated by the combining unit 150.

Therefore, as there is no area that protrudes from the display main body 121, an external appearance of the display main body 121 can be improved. Also, a comparably improved outer appearance can be maintained while the display main body 121 is combined.

The rotating member 160 is combined to the combining member 157 so that at least one adjacent display column DP can be rotated with respect to at least one display column DP. The rotating member 160 may have a shape of a metal plate. The rotating member 160 includes a rotating main body 161 and a rotating hole 163.

The rotating main body 161 is provided to have a shape of a plate and maintains enough strength while the display column DP is rotated. The rotating main body 161 may have a shape such that it can maintain a comparably favorable outer appearance while the flat display 120 is combined.

The rotating hole 163 is penetratingly formed at both lateral portions of the rotating main body 161. The rotating hole 163 is combined with the combining member 157 so that it can be rotated with respect to the combining member 157 while the display column DP is rotated.

In this case, the combining member 157 and the rotating member 160 may combine the flat displays 120 so that there is no gap between the flat displays 120 when the display column DP is seen from a front side.

Figure 6:
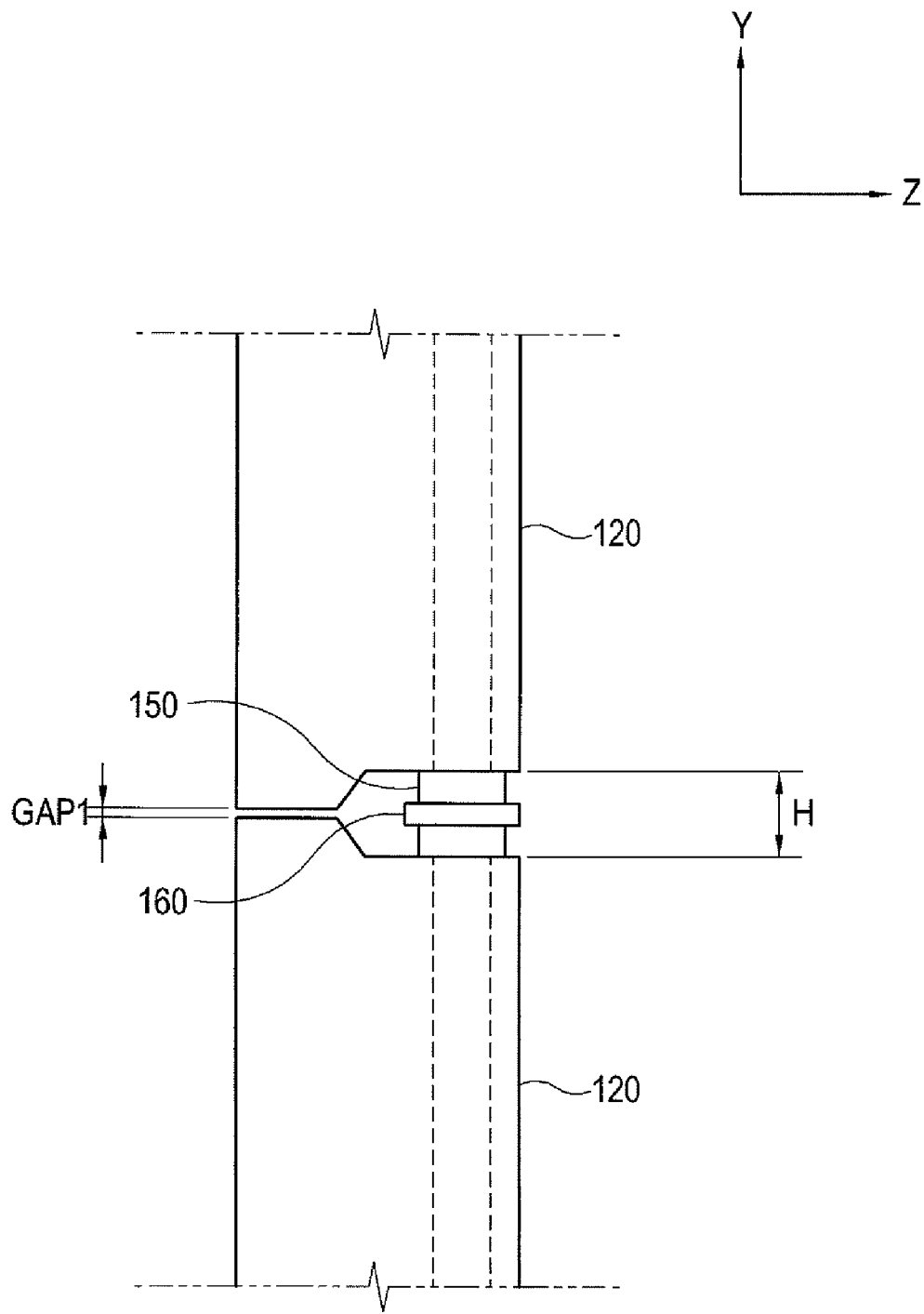
FIG. 6 is a partial lateral sectional view illustrating a portion of the flat display apparatus in FIG. 5.
Figure 7:
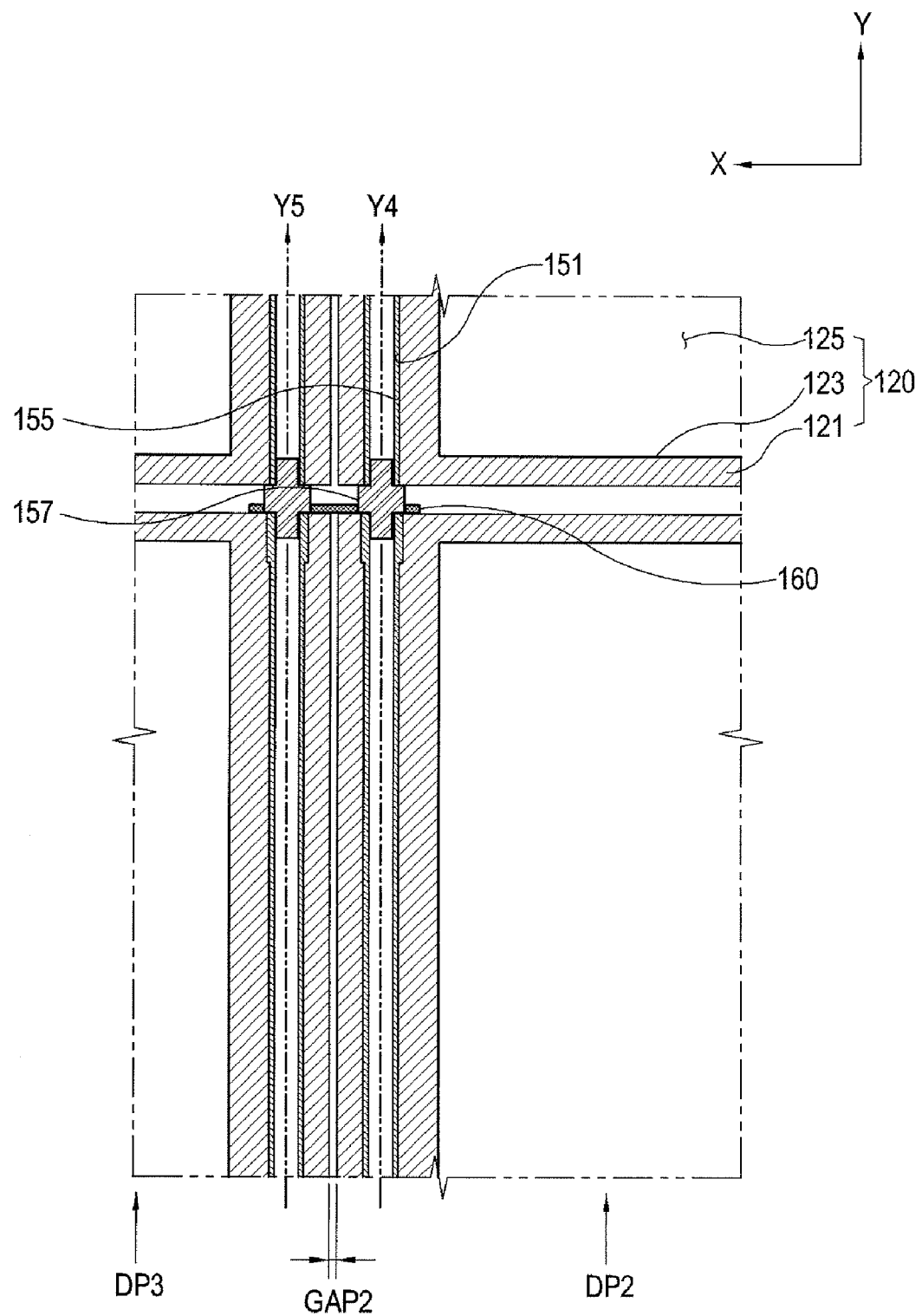
FIG. 7 is a sectional view taken along C-E in FIG. 5.

That is, as illustrated in FIG. 6, height (refer to "H" in FIG. 6) of the protruding portion 157b may be adjusted so that the gap between the upper and lower flat displays 120 or the gap between the flat display 120 and the stand 110 can be minimized (refer to "GAP1" in FIG. 6). Also, as illustrated in FIG. 7, pitch or distance of the rotating hole 163 of the rotating member 160 may be adjusted so that the gap (refer to "GAP2" in FIG. 7) between horizontally adjacent displays 120 can be minimized.

Accordingly, the display column DP can be conveniently rotated with respect to an adjacent display column DP. Also, the combining unit 150 can be easily assembled or installed.

Therefore, combining of the display columns DP can be quickly and easily accomplished and the combination structure of the display columns DP can be easily changed.

Figure 5:
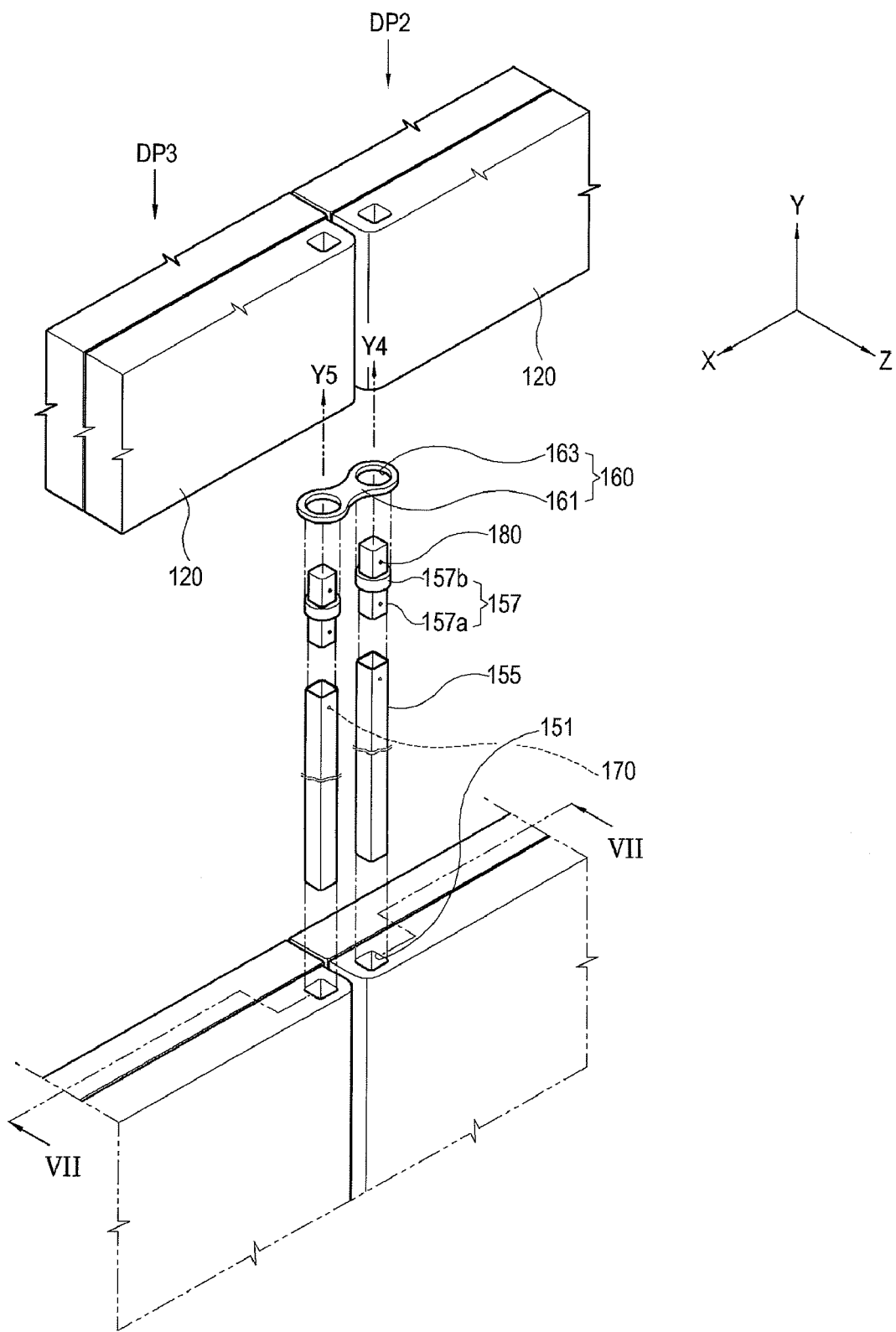
FIG. 5 is an exploded perspective view illustrating a back side of the flat display apparatus in FIG. 4.

Referring to FIG. 5, an engaged portion 170 is depressively formed in an inner portion of the reinforcing member 155 to be engaged with an engaging portion 180. In another exemplary embodiment of the present general inventive concept, the engaged portion 170 may be formed in the combining member 157.

The engaging portion 180 elastically protrudes to an outer side of the combining member 157 to be engaged with the engaged portion 170. In another exemplary embodiment of the present general inventive concept, the engaging portion 180 may be formed in the reinforcing member 155.

Accordingly, the engaging portion 180 is engages with the engaged portion 170, and the reinforcing member 155 and the combining member 157 maintain a stably combined state. Therefore, the rotating member 160 can be maintained to be stably rotated while it is rotated, so that reliability of the apparatus according to the present general inventive concept can be improved.

Figure 8:
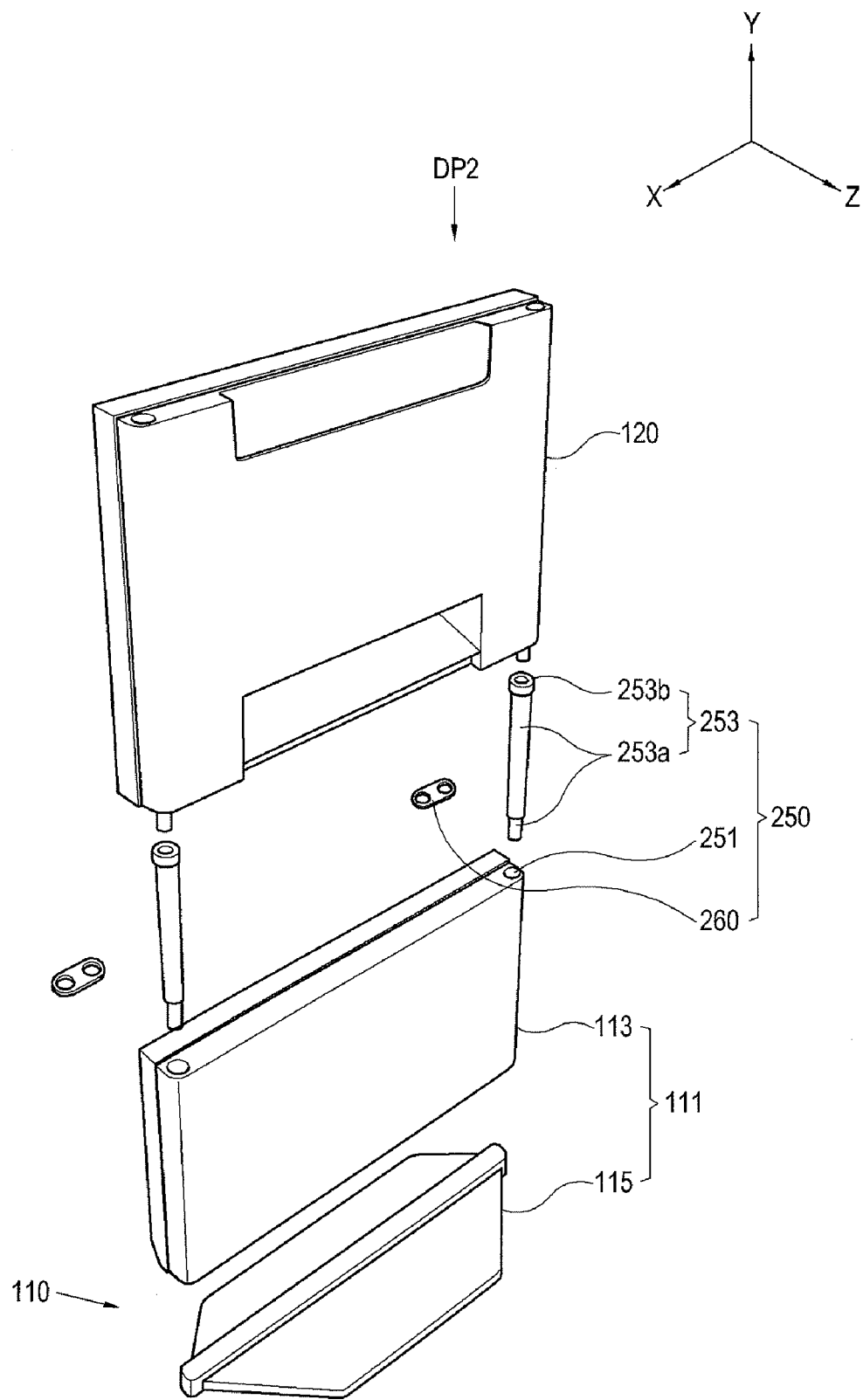
FIG. 8 is a partial exploded perspective view illustrating another exemplary embodiment of a combining member viewed from the back side of the flat display apparatus in FIG. 4.
Figure 9:
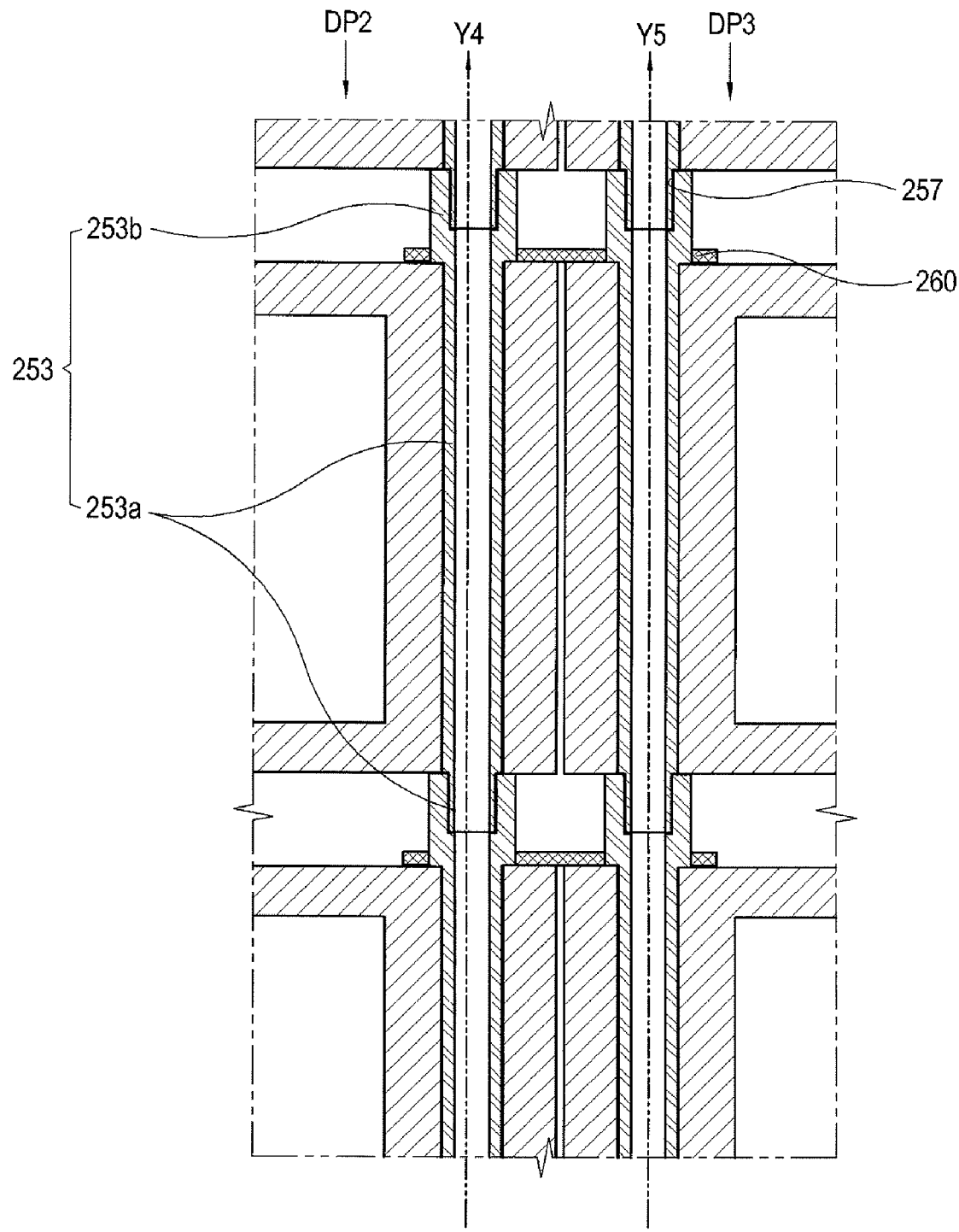
FIG. 9 is a partial sectional view illustrating a portion of the combining member in FIG. 8.

As illustrated in FIGS. 8 and 9, the combining member 253 according to an exemplary embodiment of the present general inventive concept has a different shape from the previous exemplary embodiment illustrated in FIG. 5. The combining member 253 according to the exemplary embodiment of FIGS. 8 and 9 may also perform functions of the reinforcing member 155 of the previous exemplary embodiment at the same time. That is, the combining member 253 includes an integrated receiving portion 253a which is received in the receiving member 251, and an integrated protruding portion 253b which extends from the integrated receiving portion 253a to be combined with a rotating member 260. In this case, a lower end portion of the integrated receiving portion 253a has a stopper 257.

In this case, the combining unit 250 includes the receiving member 251, the combining member 253 and the rotating member 260.

Accordingly, the combining unit 250 according to the exemplary embodiment of FIGS. 8 and 9 has a structure simpler than the combining unit 150 according to the exemplary embodiment as illustrated in FIG. 1.

With a constitution as described above, operation and control of the flat display apparatus 100 according to an exemplary embodiment of the present general inventive concept is described hereinafter with reference to FIGS. 11A to 12.

Figure 11A:
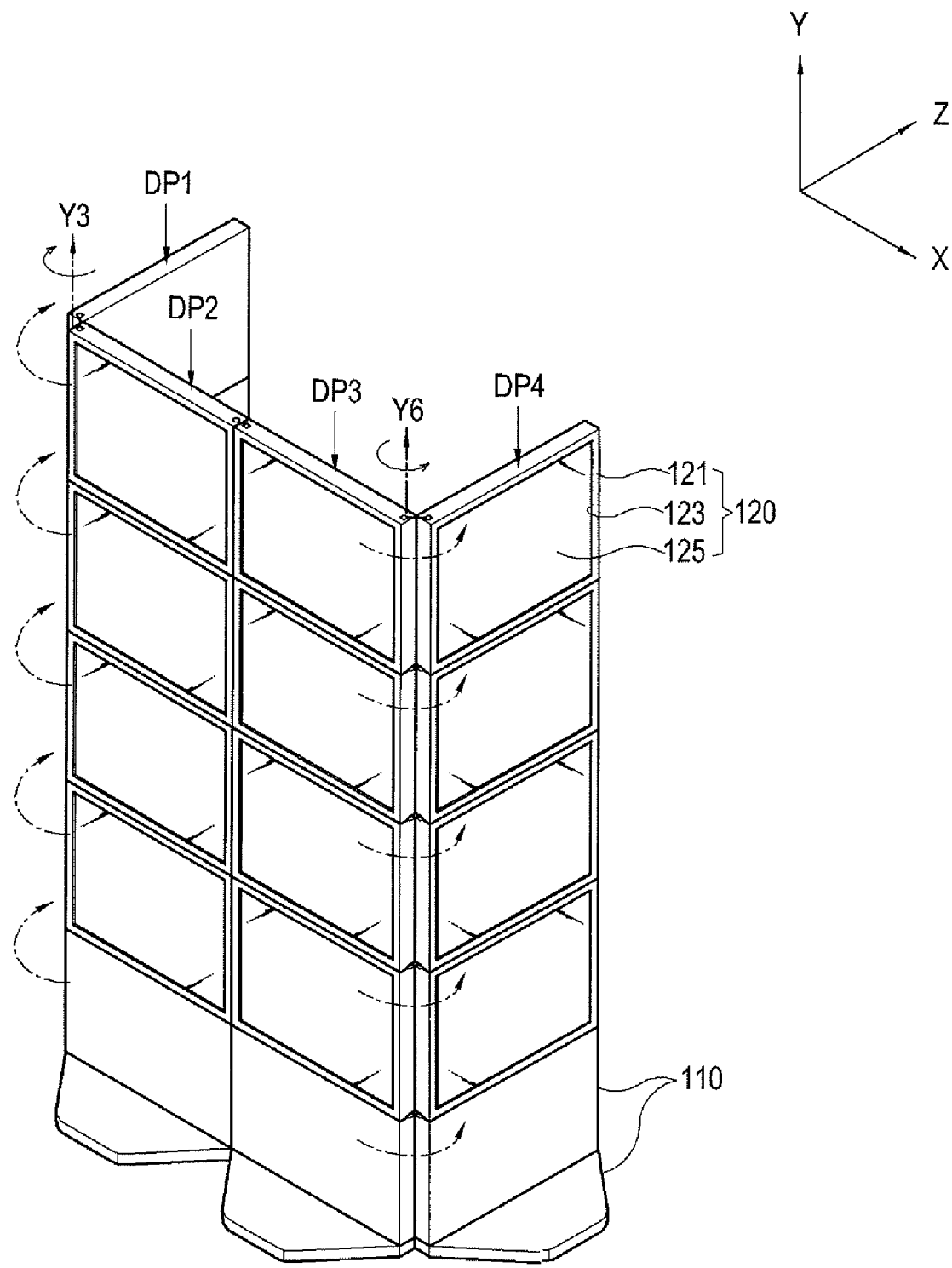
FIGS. 11A to 11C are perspective views and a plan view illustrating the flat display apparatus in FIG. 4 to describe an operation state of the flat display apparatus.

Firstly, as illustrated in FIG. 11A, the first display column DP can be rotated clockwise by 90 degrees around the axis Y3 with regard to the second display column DP2 and the third display column DP3, and the fourth display column DP4 can be rotated counterclockwise by 90 degrees around the axis Y6. Accordingly, a plan view of the display columns DP of the flat display apparatus 100 has a shape of "⊏".

Figure 11B:
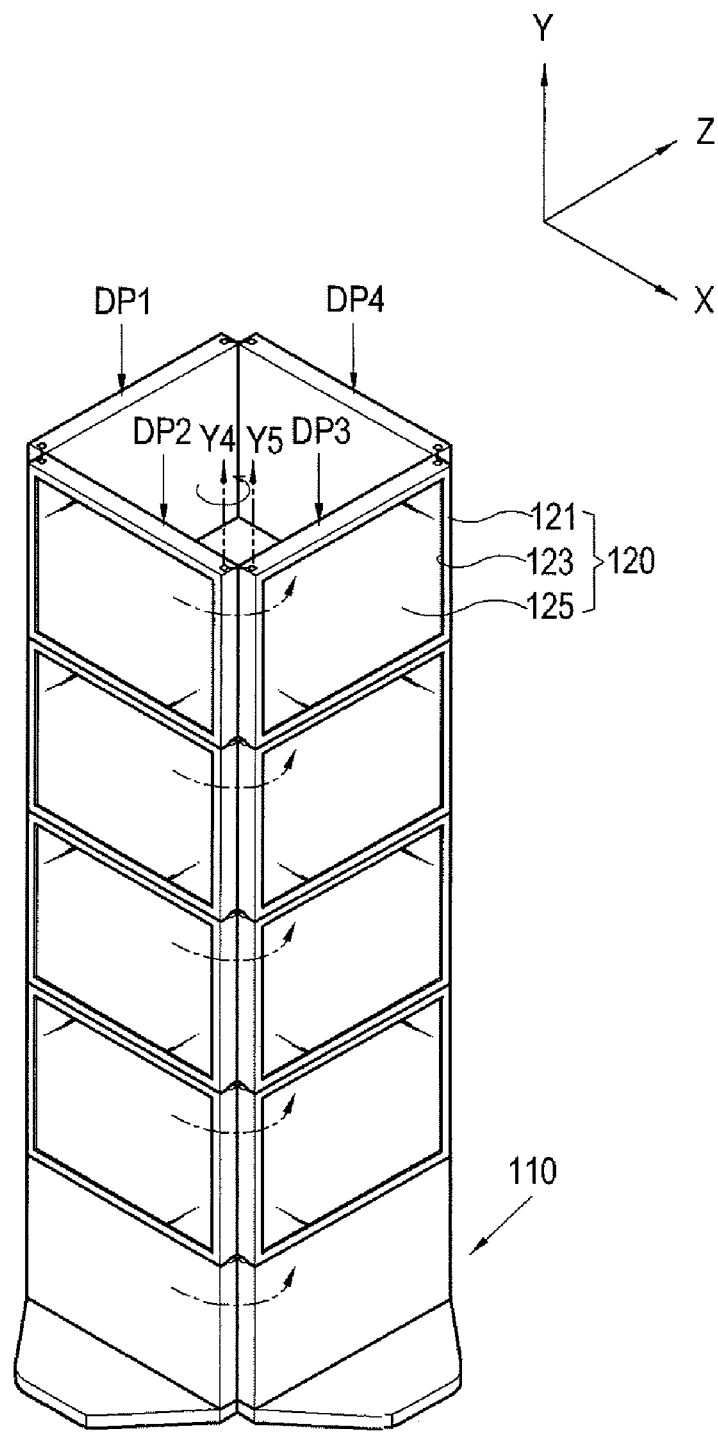

Also, as illustrated in FIG. 11B, in a state that the display columns DP are disposed, the third display column DP3 and the fourth display column DP4 can be rotated counterclockwise around the axis Y4 with regard to the second display column DP2. Accordingly, as illustrated in FIG. 11B, the plan view of the display columns DP of the flat display apparatus 100 has a shape of "□".

Alternatively, in a state that the display columns DP are disposed as illustrated in FIG. 11A, the shape in FIG. 11B may also be obtained by rotating the first display column DP1 and the second display column DP2 clockwise around the axis Y5 with regard to the third display column DP3.

In such a process, a rotating operation of the combining unit 150 is described as follows with reference to FIG. 11C. In this case, in FIG. 11C, the third display column DP3 is supposed to be rotated with respect to the second display column DP2.

Figure 11C:
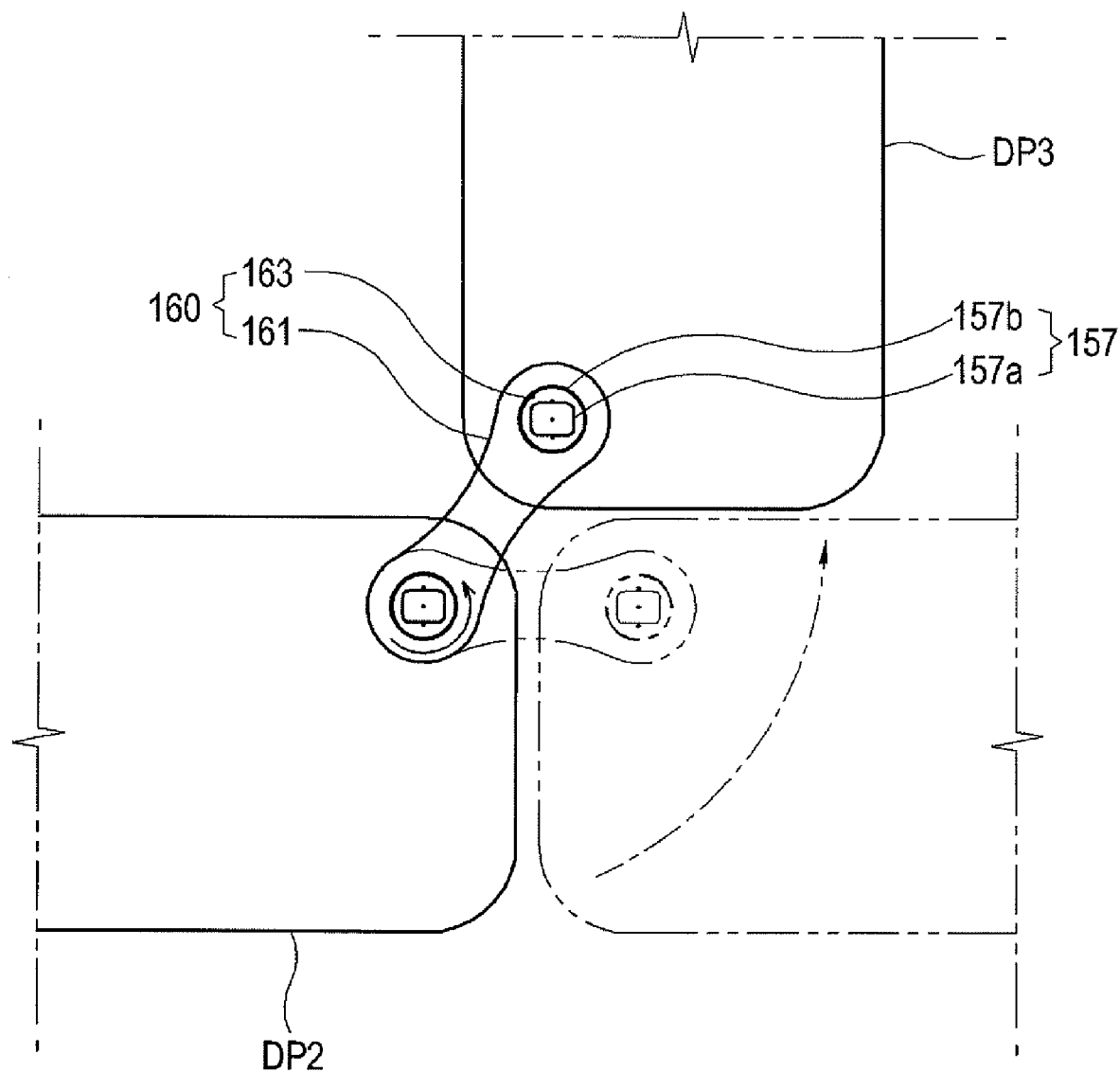

That is, from a state that the screen surfaces 125 of the second display column DP2 and the third display column DP3 are on the same plane as dotted lines in FIG. 11C, the third display column DP3 can be rotated until the screen surface 125 of the second display column DP2 is perpendicular to that of the third display column DP3.

During this process, the rotating main body 161 is rotated counterclockwise around the axis Y4 of the second display column DP2. That is, an outer surface of the protruding portion 157b contacts an inner surface of the rotating hole 163 and is rotated therebetween.

The schematic plan view of the display columns DP of the flat display apparatus 100 according to another embodiment may have various shapes including "∟", "V" and others. Also, it is easy to variously change the shape of the display column DP, thus enabling to easily respond to spaces with various shapes. Also, the combined structure of the display 120 or the display column DP may be easily and quickly changed.

Referring to FIG. 12, the process of displaying an image on the flat display apparatus 100 according to another exemplary embodiment of the present general inventive concept is described as follows.

Referring to FIG. 12, each display 120 is supposed to display an area of an entire image by dividing the entire image into 16 equal areas. Each display 120 displays one sixteenth of the entire image respectively by adjusting a size and a position of the entire image. Each display 120 displays a partial area of the entire image by adjusting a size variable which is provided to adjust the size of the image displayed on the screen and a position variable which is provided to adjust the position of the image displayed on the screen into a predetermined size variable and position variable.

That is, as illustrated in FIG. 12, a video signal input into the display DP11 (hereinafter, called as "first display") that is located at an upper portion of the first display column DP1 is the upper left corner region of an image where the size of the entire image is increased horizontally and vertically by four times respectively to display the entire image "TEST". Likewise, a partial area of the entire image is displayed on each of the remaining displays 120, and a combination of the images displayed on each display 120 may correspond to the entire image.

In this case, as illustrated in FIG. 11B, if the combined structure of the display columns DP is changed, the entire image that is formed by each display column DP may also be easily changed by a controlling unit (not illustrated).

Figure 13:
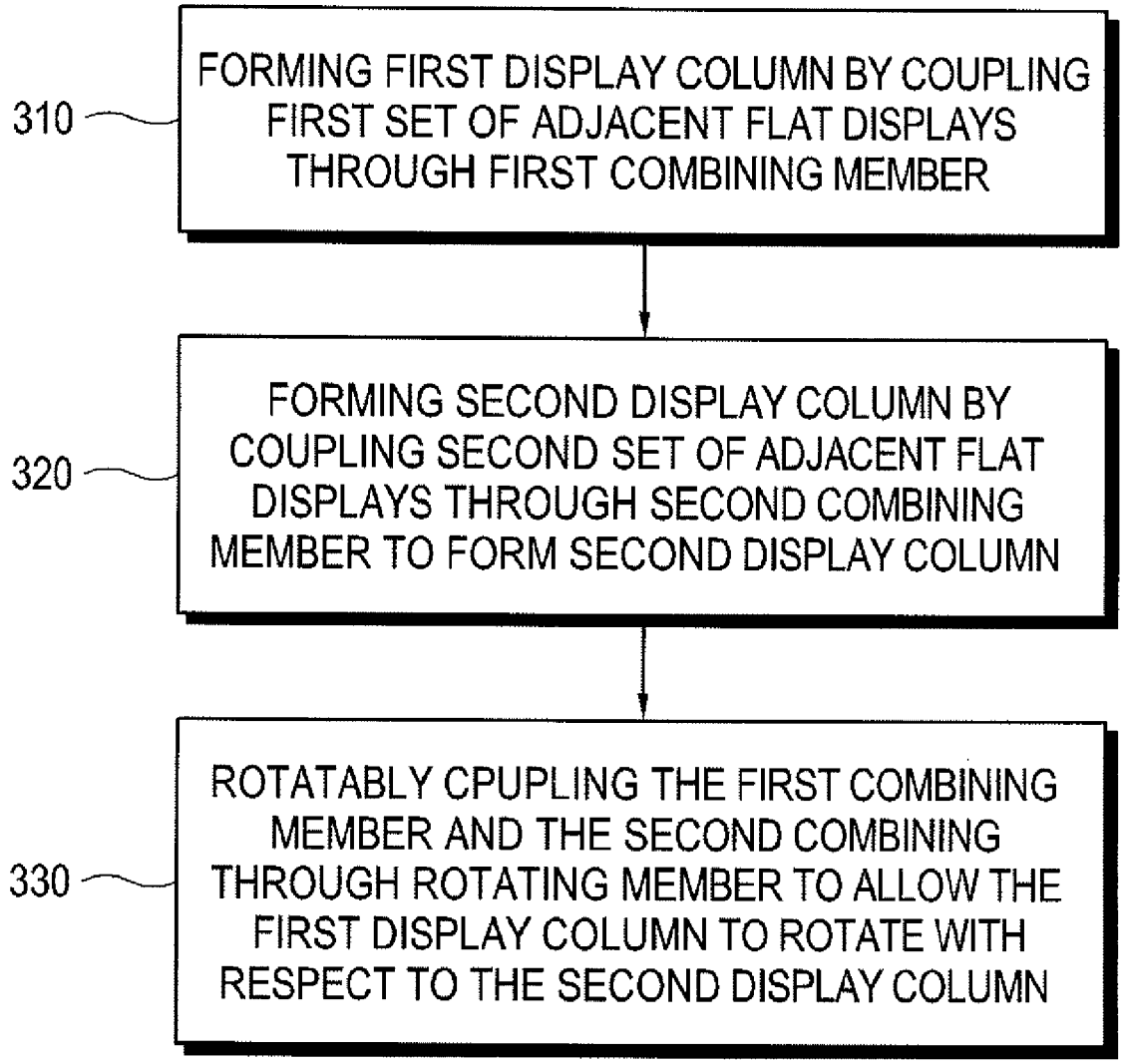
FIG. 13 is a flowchart illustrating a method of displaying a plurality of flat panels according to another embodiment of the present general inventive concept.

FIG. 13 is a flowchart illustrating a method of displaying a plurality of flat panels according to another embodiment of the present general inventive concept. Referring to FIG. 13, in operation 310, a first display column is formed by coupling a first set of adjacent flat displays through a first combining member. In operation 320, a second display column is formed by coupling a second set of adjacent flat displays through a second combining member to form a second display column. In operation 330, the first combining member and the second combining member is rotatably coupled through a rotating member to allow the first display column to rotate with respect to the second display column.

Additionally, the flat display apparatus 100 according to exemplary embodiments of the present general inventive concept may include various control methods to display a large screen image.

As described hereinbefore, according to various exemplary embodiments of the present general inventive concept, a combining of the displays can be accomplished quickly and easily.

Also, according to various embodiments of the present general inventive concept, a combined structure of display columns can be easily changed.

Also, according to various embodiments the present general inventive concept, an outer appearance and reliability can be improved.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A flat display apparatus, comprising:
    a stand;
    at least one display having a display panel to receive a video signal to display an image, a display main body to receive the display panel and a receiving member that is formed with receiving holes disposed at opposite lateral sides of the display main body;
    a combining member which is combined to the receiving member and to form a display column by laying the display on the stand in a vertical direction; and
    a rotating member which is combined with the combining member so that the display column can be rotated with respect to at least an other display column,
    wherein the display comprises a front cover having a display opening and a rear cover combined to the front cover to receive the display panel, and the receiving holes are distant apart from end portions of the opposite lateral sides of the display panel.

2. The flat display apparatus according to claim 1, wherein the receiving holes face each other at the opposite lateral sides of the display main body and are spaced apart from a projection area of the display panel at a back side of the display panel.

3. The flat display apparatus according to claim 1, further comprising:
    a reinforcing member to correspond to a shape of the receiving member and to be combined to the receiving member.

4. The flat display apparatus according to claim 3, wherein the combining member has an inserting portion which is combined to the receiving member or the reinforcing member, and a protruding member having a circumference larger than a circumference of the inserting portion.

5. The flat display apparatus according to claim 1, wherein the combining member is combined to the receiving member to form the display column by laying a plurality of displays on the stand in a vertical direction.

6. The flat display apparatus according to claim 1, wherein the stand has a vertical member which is combined with the display in a vertical direction.

7. The flat display apparatus according to claim 1, wherein the receiving member comprises not more than one hole on one lateral side of a back side of the display main body, and not more than one hole on the opposite lateral side.

8. The flat display apparatus according to claim 1, wherein the receiving holes are distant from end portions of the opposite lateral sides of the display panel by a first predetermined distance and are distant from end portions of a back side of the display panel by a second predetermined distance.

9. The flat display apparatus according to claim 8, wherein the first predetermined distance is different than the second predetermined distance.

10. The flat display apparatus according to claim 1, wherein the receiving holes are formed in the rear cover.

11. A flat display apparatus comprising:
    a plurality of display main bodies having a plurality of display openings;
    a plurality of display panels that receive an electronic signal disposed in the display openings;
    at least one first combining member to couple a first set of the display main bodies to form a first display column; and
    a rotating member to rotatably couple the first display column and a second display column about an axis to allow the first display column to rotate with respect to the second display column,
    wherein the display main bodies comprise respective front covers having the display openings to receive the display panels and rear covers combined with the front covers.

12. The flat display apparatus of claim 11, wherein the first display column has a plurality of first combining members to couple the first set of display main bodies and the second display column has a plurality of second combining members to couple a second set of display main bodies.

13. A flat display apparatus comprising:
    a plurality of flat displays that comprise display panels to receive a video signal, the plurality of flat displays having a plurality of receiving holes disposed at opposite lateral sides of the flat displays;
    a plurality of reinforcing members to fit within the receiving holes; and
    a plurality of combining members having an insertion portion to fit within the plurality of reinforcing members and a protrusion portion to rest atop the plurality of reinforcing members and atop the plurality of flat displays, the combining members joining a first flat display to a second flat display among the plurality of flat displays; and
    a rotating member which is combined with a combining member so that a display column having the plurality of flat displays can be rotated with respect to at least an other display column,
    wherein the plurality of flat displays comprise respective front covers having a display opening and rear covers combined to the front covers to receive the display panel, and the receiving holes are distant apart from end portions of the opposite lateral sides of the display panels.

14. The flat display apparatus of claim 13, further comprising:
    a receiving member that comprises not more than one hole on one side of the plurality of flat displays, and not more than one hole on the opposite side of the plurality of flat displays.

* * * * *